June 14, 1932.  J. V. MARTIN  1,862,693
TIRE
Filed March 2, 1926
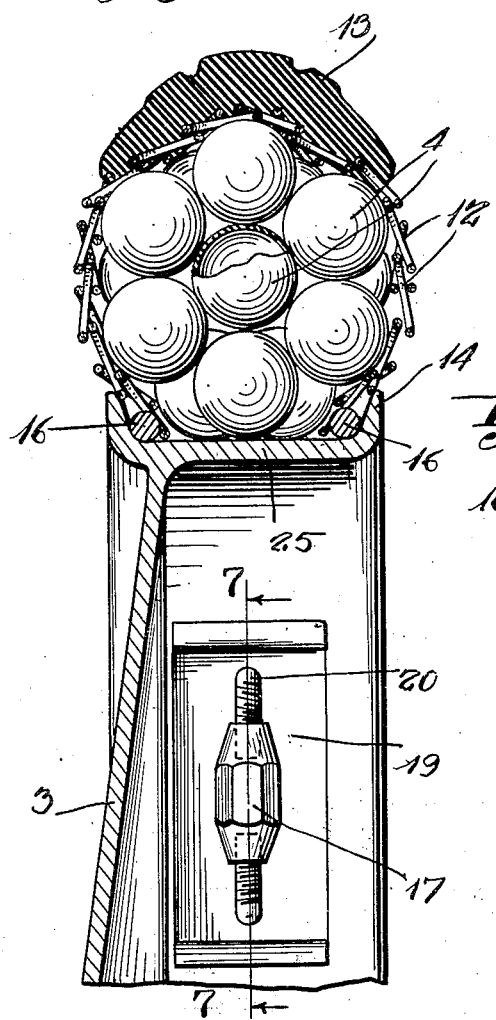
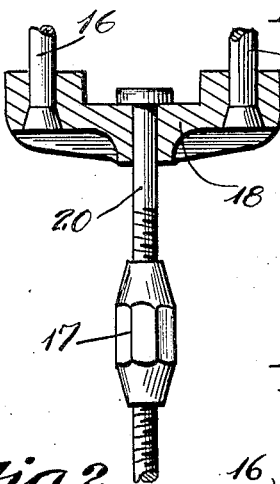
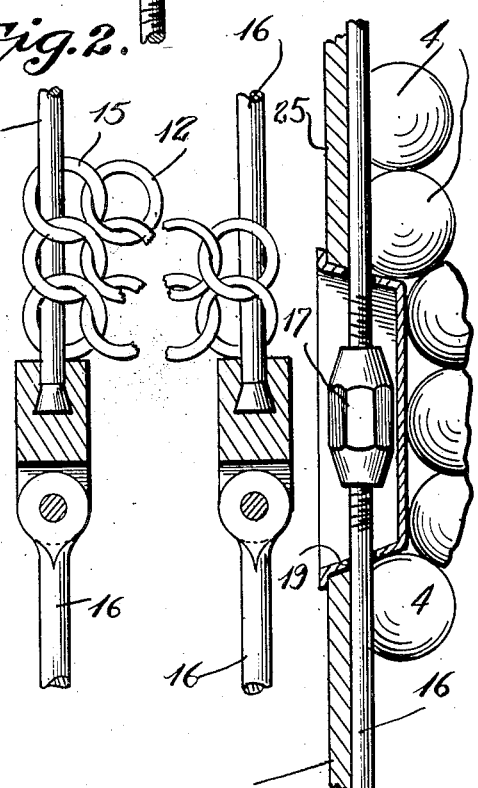
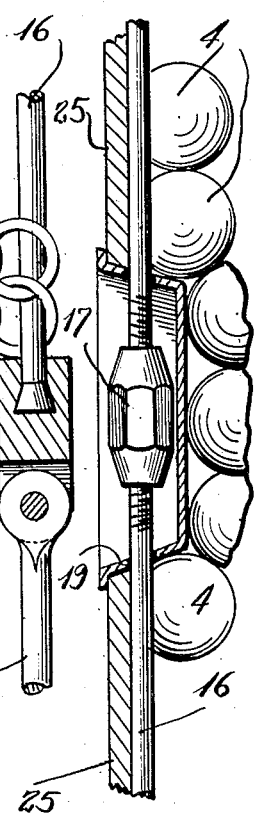
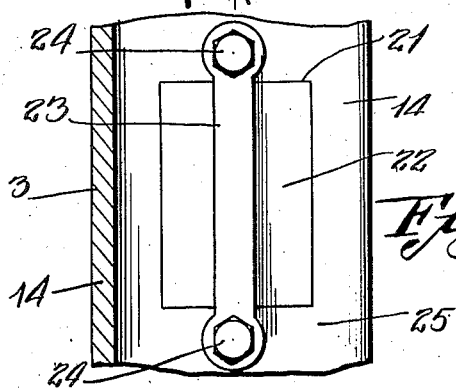
INVENTOR
James V. Martin Patented June 14, 1932

1,862,693

UNITED STATES PATENT OFFICE

JAMES V. MARTIN, OF GARDEN CITY, NEW YORK

TIRE

Application filed March 2, 1926. Serial No. 91,792.

The primary object of my invention is to produce a tire which will not flatten or deflate when punctured, but which will otherwise possess the characteristics of the pneumatic tire as to light weight, cushioning, and long mileage and in addition possess the advantages of low cost, ease of repair and especially easy heat radiation.

Other objects of my invention will become readily apparent from the following disclosure:—

Fig. 1 is an end elevational view showing my invention in a preferred form which permits of cool air reaching the interior balls within the casing.

Fig. 2 is a plan view looking down on the two wires which keep the tire firmly within the rim flanges, this view shows how the rings which form the main portion of the casing interlock with each other and with the retaining wires.

Fig. 3 shows one form of tightening the retaining wires by a yoke and turnbuckle.

Fig. 4 is a side elevation showing how the rim is indentured where the turnbuckle can be operated without disturbing the tire filler, taken on line 7—7 of Fig. 4.

Fig. 5 shows a removable plate from the under side of the wheel rim, to permit filling and removing of the tire filler readily, and to increase tire pressure.

Numeral 12 in Figs. 1 and 2 shows the preferred form of my invention, i. e., a casing permitting heat to radiate to the air directly from the inner portions of the casing and balls 4. Any suitable tread 13 can be cured or otherwise attached to the rings 15, and the rings themselves may be made of metal or of any other suitable material such as rubber or hemp, the main feature in their form being the open netform, which, while holding the balls within the casing, the rings or net strips permit the air to circulate freely about the balls. One of the greatest enemies to tire mileage has been the difficulty of keeping the tire cool. The ring or net casing may be secured in place on the wheel rim 14 in a number of ways, only one of which is indicated, i. e., the use of wires or rods 16 to hold the casing firmly within a straightside rim, and a very convenient method of attaching and detaching the casing by loosening the turnbuckle 17 which holds two yokes such as 18 Fig. 6 and in which yokes the ends of the retainer wires 16 are riveted, threaded or held by a nut. In order to remove the tire from the wheel an indenture 19 in the under side of the rim 14 permits access to the turnbuckle 17 and when this is released or loosened the expansion of the ring of net casing readily permits the tire to slip over the rim flanges 14. But it is not necessary to loosen the casing at all in order to fill the casing with balls or to replace damaged balls, for an opening 21 in the under side of the rim 14 (Fig. 5) is provided with a cover plate 22 held in place by a metal strap 23, secured by bolts 24, and as will be apparent from the rim portion 25, Fig. 1, the balls may be inserted into or removed from the casing without disturbing the tension of the retainer wires 16. As the plate 22 obtrudes within the casing after the manner of 19, by tightening the bolts 24 the pressure of the balls on the inside of the casing may be increased. The yoke 18 may be dispensed with in favor of a right and left thread turned directly on the wires 16 as indicated in Fig. 4, but in this case two turnbuckles would be used. It will be apparent from a glance at the drawings that the turnbuckle 17 and wires 16 in combination with the taper rim 14 can greatly compress the rubber balls.

The balls 4 may be made with air or gas under pressure within them or they may be made of sponge rubber with an outer coating to resist wear. The sections of the rings or net material should be perfectly smooth and round as shown, so as not to wear the balls unnecessarily.

The application of my invention will be readily apparent from inspection. Vehicles almost universally require the cushioning action of air or rubber or both in the form of a tire, and while the form of suspension disclosed in my Patents Nos. 1,432,771—1,546,500—1,471,968 and my co-pending applications Serial Nos. 65,596 and 91,130 will lessen the tire cushioning required, the use of both air and rubber as a cushion may be obtained through my invention without the delays and annoyances now attendant upon puncture of the conventional pneumatic tire. The dissipation of heat made possible by my novel ring or net casing directly inclosing objects formed to allow air circulation about them should greatly prolong the tire life as heat is possibly the greatest enemy of the conventional tire.

Obviously wide latitude respecting alteration of details may be had without departing from the spirit of my invention and I do not care to limit myself to the precise form of tire disclosed.

What I claim is:—

1. The combination in a vehicle disc wheel and tire of a tread cured to a flexible metal part, a metal wheel rim portion rigid with the said wheel disc, multiple rubber means of spacing the said part and portion apart and air openings around all sides of the said means for the circulation of air therebetween and heat radiating contact between the said disc-rim and the said rubber means.

2. In a resilient tire, a tread of flexible material, a metallic mesh structure centrally vulcanized to the inner surface of said tread and exposed thereon, said mesh structure constituting heat radiating means for said tread, the side portions of said mesh structure projecting laterally from the tread to constitute open mesh side walls for the tire, means for securing the lateral edges of the side walls to a wheel center, and a multiplicity of rubber objects in the space within the mesh structure, the major number of the said objects being in contact with the metallic mesh whereby the latter acts to radiate heat from said objects.

In testimony whereof I affix my signature.

JAMES V. MARTIN.